United States Patent
Gärtner

[11] 3,937,089
[45] Feb. 10, 1976

[54] SCREW DRIVE

[76] Inventor: Robert Gärtner, Freiherr vom Stein Str. 8, 6038 Butzsbach, Hessen, Germany

[22] Filed: Dec. 18, 1973

[21] Appl. No.: 425,924

[30] Foreign Application Priority Data
Dec. 19, 1972 Germany............................ 2262062

[52] U.S. Cl. ................................................. 74/25
[51] Int. Cl.²........................................ F16H 21/16
[58] Field of Search................................ 74/25, 89

[56] References Cited
UNITED STATES PATENTS

| | | | |
|---|---|---|---|
| 2,741,923 | 4/1956 | Bradley | 74/25 |
| 2,940,322 | 6/1960 | Uhing | 74/25 |
| 3,394,599 | 7/1968 | Tucker | 74/25 |
| 3,789,678 | 2/1974 | Gartner | 74/25 |

*Primary Examiner*—Samuel Scott
*Assistant Examiner*—Wesley S. Ratliff, Jr.
*Attorney, Agent, or Firm*—Walter Becker

[57] ABSTRACT

A screw drive with a threaded spindle and frame means embracing the same, in which as transmitting member between the frame and the spindle there is pivotally arranged at least one anti-friction bearing surrounding the spindle and having an inner ring meshing with the thread of the spindle while the central axis of the anti-friction bearing is inclined and eccentrically arranged with regard to the spindle, the anti-friction bearing also having an outer ring which is pivotal about a rigid axis, in the frame means, which axis is located in the direction of the eccentricity of the outer ring toward the spindle axis.

10 Claims, 9 Drawing Figures

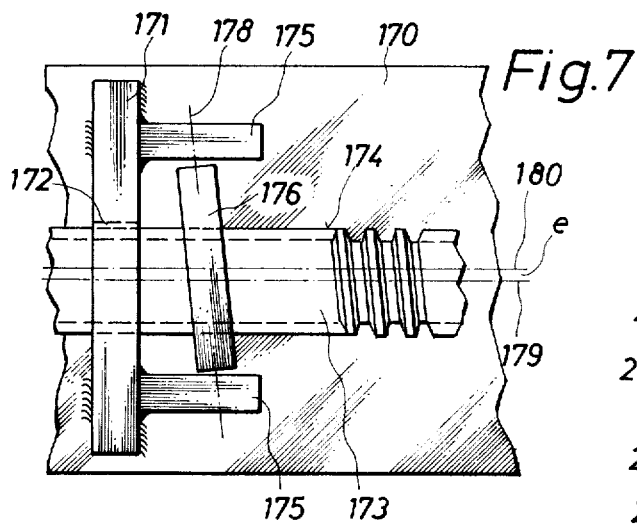
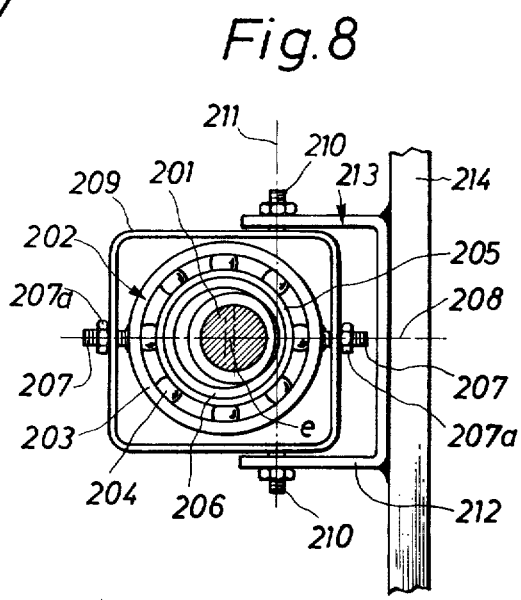
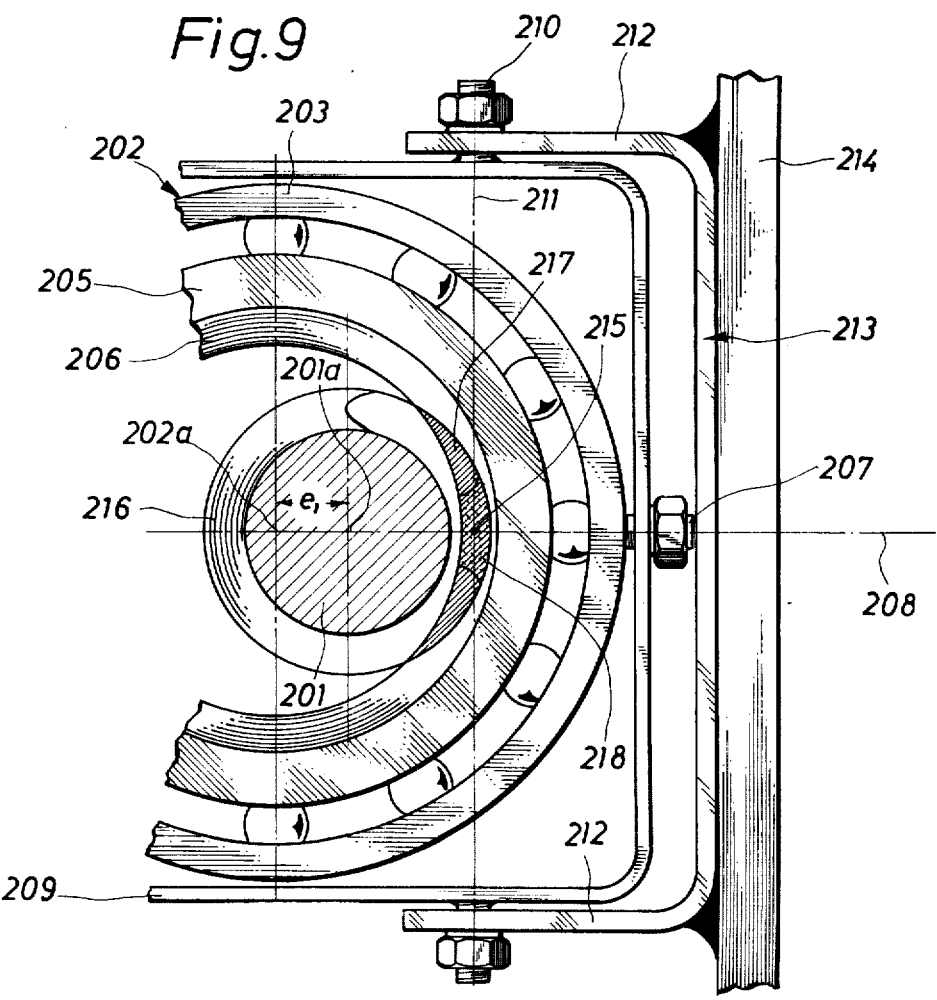

SCREW DRIVE

The present invention relates to a screw drive with a spindle and a frame surrounding the same in which as transmission member between the frame and the spindle there is provided at least one pivotable anti-friction bearing which surrounds said spindle while the inner ring of said anti-friction bearing engages the threads of the spindle, and the central axis of said bearing is inclined relative to the spindle and is arranged eccentrically.

A screw drive has become known in which a self-aligning ball bearing eccentrically extends around a spindle and the inner ring of which comprises an inner thread corresponding to the thread of the spindle. Said self-aligning ball bearing is adjustable in a frame in the direction of the eccentricity of the bearing axis relative to the spindle axis. In this direction, also spring elements act upon the self-aligning ball bearing by means of which spring elements the engagement of the inner thread of the self-aligning ball bearing with the spindle thread can be made resilient.

By selecting self-aligning ball bearings with this heretofore known design, an adaptation of the thread of the self-aligning ball bearing with regard to the location of the thread of the spindle is intended to be obtained while it will not be necessary to employ high manufacturing and mounting precision of the thread of the self-aligning ball bearing and of the spindle thread supporting said bearing. For purposes of transferring low forces from the spindle to the frame supporting said self-aligning ball bearing, this heretofore known design suffices when disregarding the occurring wear and the necessity of a continuous good lubrication of the spindle thread. When transferring large forces from the spindle onto the frame carrying the bearing or vice versa, it will be appreciated that in view of the eccentricity of the spindle axis and of the axis of the self-aligning ball bearing and of the only unilateral engagement of the spindle thread with the inner thread of the self-aligning ball bearing, a torque will act upon said self-aligning ball bearings which brings about a canting or tilting of the inner thread of the bearing in the thread of the spindle. The greater the force to be transmitted, the greater the canting of the thread of the bearing press upon the thread sections of the spindle.

There has furthermore become known a screw drive with a spindle and a frame surrounding same, in which as transfer member there is arranged an anti-friction bearing which extends around the spindle, and the inner ring of which engages the thread of the spindle while the central axis of said anti-friction bearing is inclined relative to said spindle. For adapting the location or position of the inner ring of the anti-friction bearing to the spindle thread, adjustable or elastic elements are provided between the outer ring of the anti-friction bearing and the frame.

It is, therefore, an object of the present invention to provide a screw drive in which a spindle manufactured without high precision and also one or more simple inner rings which engage the said spindle thread and pertain to one or more anti-friction bearings may be used. There inner rings adapt themselves on one hand with regard to location and design too those sections of the spindle thread which engage said inner rings and on the other hand will not permit a canting which might lead to a jamming of the inner ring in the threads of the spindle.

These and other objects and advantages of the invention will appear more clearly in the following specification in connection with the accompanying drawings, in which.

Figure 2:
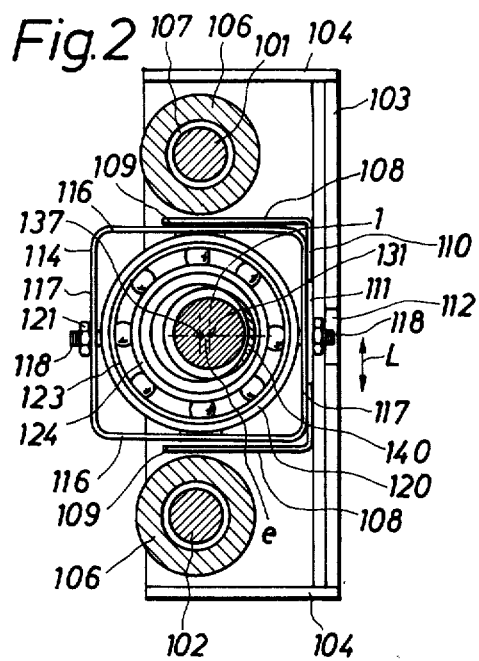
FIG. 2 is an end view partial in section of the screw drive according to the invention.

FIGS. 4–7 respectively indicate different types of connecting the frame to a supporting or machine part.

FIGS. 8 and 9 illustrate an embodiment of the invention in which the pivot axis of the frame is offset relative to the anti-friction bearing means.

The screw drive according to the present invention is characterized primarily in that the outer ring of the anti-friction bearing is pivotable about a rigid axis in the frame which is pivotable in a direction of the eccentricity of the axis of the ring with regard to the spindle axis.

According to an advantageous embodiment of the screw drive according to the invention, the outer ring of the anti-friction bearing comprises two threaded journals which in the direction of the eccentricity extend outwardly and which are supported by two bores of the frame.

The invention is based on the finding that the canting and the clamping of the inner ring relative to the threaded spindle can be avoided by designing the anti-friction bearing so that it will be pivotable about a rigid axis extending in the direction of the eccentricity.

Preferably the outer ring of the anti-friction bearing is resiliently arranged in a manner known per se with regard to the frame. Those parts of the frame which support the threaded journal may be resilient in the direction of the eccentricity. In this connection it is advantageous to design the spring force which acts upon the outer ring so that it can be adjusted.

The frame supporting the anti-friction bearing may furthermore be designed as a U-shaped frame having two webs through which extend the journals connected to the anti-friction bearing. According to a different embodiment of the invention, the frame may be designed as a plate-shaped part with parallel legs which are perpendicular to the plate-shaped part. The anti-friction bearing is pivotable between said legs while the spindle extends through the plate-shaped part.

A particularly advantageous screw drive is obtained when the frame is pivotable about an axis which in the direction of the eccentricity is offset with regard to the center of the anti-friction bearing, said axis extending at a right angle to the direction of the eccentricity and to the direction of the spindle axis. An optimum embodiment is obtained in this way in which the pivot axis of the frame extends through the point of contact of maximum pressure (Hertz pressure maximum) between the inner ring flank and the threaded frame section which is in contact with said inner flank. The frame may preferably be held in a support which surrounds said frame entirely or partially. The journals forming the pivot axle of the frame are rotatably journaled in the side parts or legs of said support.

Referring now to the drawings in detail, a frame 100 is guided in the direction of the double arrow K by two parallel bars 101 and 102. To this end, the frame has a bottom plate 103, two parallel side walls 104, and two likewise parallel end walls 105 through which the two guiding bars 101, 102 extend. The frame may have corresponding bushing parts 106 which slide directly or through the intervention of a lining provided in an intermediate chamber 107, on the bars 101 and 102.

The bottom plate 103 supports two angle irons 108, the legs 109 of which point away from the bottom plate 103 and extend beyond the height of the bars 101, 102. The second legs 110 of the two angle irons 108 leave free an intermediate chamber 111 which is coaxial with a recess 112 provided in the bottom plate 103.

Figure 1:
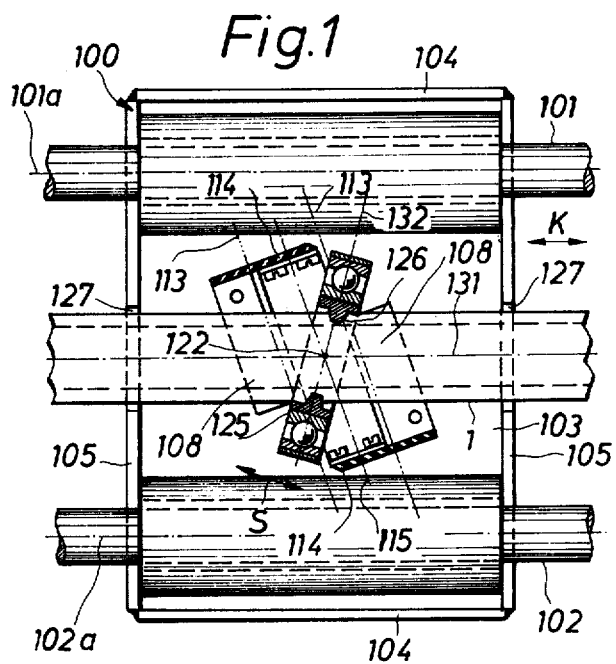
FIG. 1 is a top view and partial section of an embodiment of a screw drive according to the present invention.

The two angle irons 108 may also be replaced by a U-shaped bracket with a perforation corresponding to the intermediate chamber 111. Also the longitudinal axis 113 of the two angle irons 101 or of the one-piece bracket may extend at a right angle with regard to the longitudinal axis 101a, 102a of the two bars 101, 102 instead as shown in FIG. 1 at an acute angle to said longitudinal axis.

The spring frame 114 with its axis 115 which frame is supported by the two angle irons or the bracket, is located in conformity with a position of the angle irons 108 relative to the longitudinal axes 101a, 102a of the bars 101, 102. This spring frame is made preferably of a spring steel strap and either has a round cross section or, as indicated in FIG. 2 has a square shaped cross section. The spring frame has its two sections 116 connected by screws to the legs 109 of the two angle irons 108. Preferably, a circular intermediate chamber or space is provided between the legs 109 and the sections 116 so that the two sections 116 of the spring frame 114 can move somewhat resiliently if necessary in the direction of the double arrow L while the two sections 116 can bend with their ends toward one or the other side.

The two sections 117 of the frame 114 are provided with two coaxial bores through each of which extends a threaded journal. These journals are connected to a ring 120 and each journal carries outside the frame 114 a nut 121 and a non-illustrated counter-nut. Thus, ring 120 can, with the parts described further below, be adjusted in the spring frame 114 in the longitudinal direction of the journal 118 so that the ring 120 will be able to occupy any position between the two sections 117 of the frame 114. In view of the journals 118, the ring 120 can also be pivoted about an axis 122 (FIG. 1) extending through the journals 118, and more specifically can be pivoted in the direction of the double arrows S.

Connected to the ring 120, for instance by cementing, is an outer ring 123 of an anti-friction bearing the ring 124 of which is connected to an inner ring 125 likewise for instance by cementing. The annular bead 126 of ring 125 engages a thread winding of the threaded spindle 1, in which a manner described further below. The threaded spindle extends through two openings 127 of the end walls 105 of frame 100 at a corresponding distance from the bottom plate 103 of the frame. The rings 120, 123 on one hand and rings 124, 125 on the other hand may form an integral single part. The inner ring 125 with its bead 126 has a greater diameter than the outer diameter of the spindle. As will be evident from FIG. 2, ring 125 is offset relative to the spindle axis 131 by the eccentricity $e$. The eccentricity $e$ of the spindle axis 131 with regard to the axis 137 of ring 125 (the direction of which coincides with the axis 122) is so selected that the bead 126 engages in a sickle shaped form the flank 128 and/or 129 of the thread winding 130 of spindle 1. This sickle or crescent shaped engaging surface 140 is indicated in FIG. 2 by dash lines.

Figure 3:
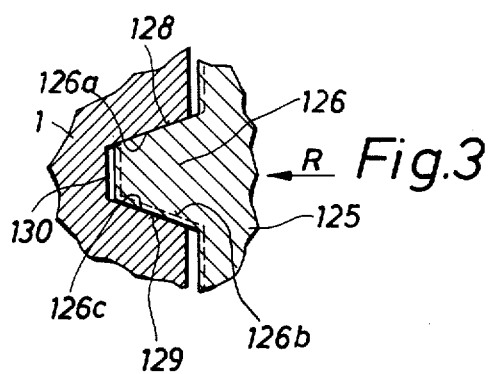
FIG. 3 shows a detail of the engagement of the anti-friction ring with the thread of the spindle of this embodiment.

The extent to which the bead 126 engages the thread winding 130 of spindle 1 is determined by the eccentricity $e$ and the preload at which the ring 120 with its additional rings located at its inner space is by the spring tension of frame 114 pressed in the direction of the two journals 118. As indicated in FIG. 3, either a position of the bead 26 can be selected in which the bead section 126a engages the flank 128 of the thread winding 13 whereas the second bead section 126b does not engage the second flank 129, or for a play-free interengagement of the bead 126 in position 126c the second bead section engages the second thread winding flank. In order to compensate for lack of precision in the guiding of the frame 100 and also in the design of the spindle 1, the bead 126 is through the intervention of ring 120 pressed by the spring effect of frame 14, in the direction of the arrow R (FIG. 3) into the thread winding 130 of spindle 1 with a preset force. The ring 120 will in view of its possibility of pivoting about journal 118 place itself into an optimum position.

The illustrated embodiment permits the use of additional transmitting elements in the form of rings 120, 123, 124, 125 which, however, need not necessarility be parallel to each other. These additional transmitting elements are rather preferably so arranged that the sickle shaped surface 140 between the bead 126 and the thread flanks 128, 129 of the spindle is offset by 150°. In this way, a uniform distribution of the forces over the cross section of spindle 1 is obtained which means a sickle shaped region 140 each being offset by 120° engages successive or spaced thread winding flanks of the spindle.

Figure 4:
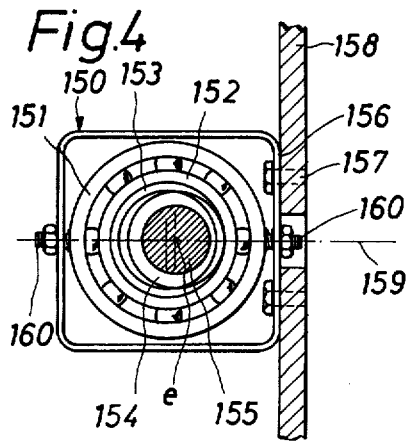

According to the embodiment illustrated in FIG. 4, an anti-friction bearing 151 with a bearing ring 152 is journaled in frame 150 while the inner ring 153 of said bearing 151 engages the thread 154 of spindle 155. Frame 150 is designed rigid or resilient and has web 156' by means of two screws 157 connected to a machine part 158. Similar to the embodiment of FIGS. 1–3, the anti-friction bearing 151 is pivotable about the axis 159 which is located in the direction of the eccentricity $e$ and extends through the two journals or pivots 160.

Figure 5:
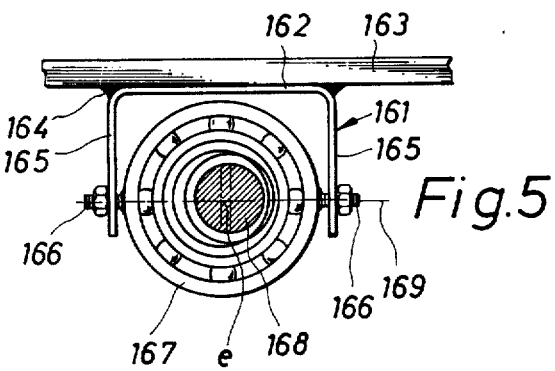

According to the embodiment of FIG. 5, the frame 161 is U-shaped and has its web 152 connected to a machine part 163 for instance by welding. The threaded pinions 166 which form the rigid pivot axis of the anti-friction bearing 167 extend through the two legs 165 of the U-shaped frame 161. Also in this instance, the anti-friction bearing 167 is offset relative to the spindle 168 by the eccentricity $e$ in the direction of which there is also located the axis 169 about which the anti-friction bearing 167 is pivotable.

Figure 6:
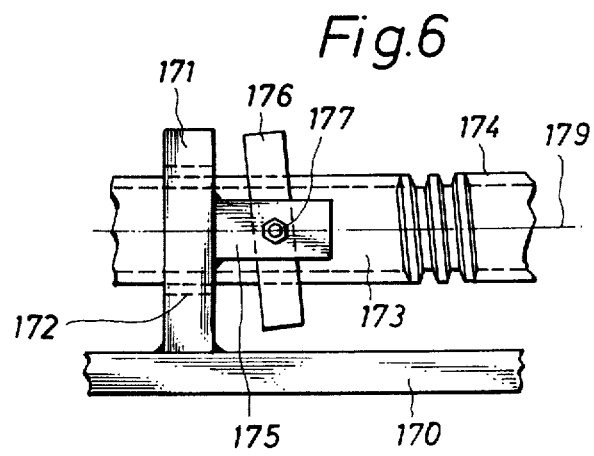

According to the embodiment of FIGS. 6 and 7, a plate-shaped part 171 is mounted on a machine part 170 which part 171 is provided with a bore 172 through which extends the threaded spindle 173. The bore 172 may be so designed that the outer thread rim 174 is guided in said bore 172.

The plate-shaped part 171 is provided with two parallel legs 175 which extend at a right angle with regard to the plate-shaped part 171 and which are provided with bores through which extend the threaded pivots 177 by means of which the anti-friction bearing 176 is held in its position. The bores for the pivots 177 are so arranged that the anti-friction bearing 176 has an inclination corresponding to the thread pitch of the spindle 173. On the other hand, as will be seen from FIG. 7, the anti-friction bearing axis 180 is offset with regard to the central axis 179 of spindle 173 by the eccentricity e. The anti-friction bearing 176 is adapted to pivot about the axis 178 of the pivot 176.

According to the embodiment of FIGS. 8 and 9, the spindle 201 is surrounded by an anti-friction bearing 202 which comprises an outer ring 203 and an anti-friction ring 205 spaced from the outer ring 203 by balls 204. Within the ring 205 there is held an inner ring 206 for instance the cementing or welding. The two rings 205 and 206 may if desired also form an integral part.

The outer ring 203 of the anti-friction bearing 202 is provided with two diametrically oppositely located threaded journals 207 which extend outwardly and form a rigid pivot axis which extends to the central axis 202a (FIG. 9) of the anti-friction bearing. The two pivots 207 extend through a rectangular or square frame 207 and by nuts 207a or other suitable means are held in such a position that the anti-friction bearing can freely pivot about the axis 208.

The frame 209 on one hand is provided with two outwardly extending threaded pivots or journals 210 which likewise form a pivot axis 211 about which the frame 209 is pivotable. This frame is at the parts supporting same arranged relative to the spindle 201 in such a way that the central axis 202a of the anti-friction bearing 202 is offset relative to the longitudinal axis 201a of spindle 201 by the eccentricity e. While the pivot axis 208 which extends through the two pivots 207 extends in the direction of this eccentricity e, the pivot axis 211 of frame 209 is located perpendicularly with regard to the axis 208 and perpendicularly with regard to the axis 201a of spindle 201. As will be seen from FIG. 9, the pivot axis 211 of the frame is offset relative to the central axis 202a of the anti-friction bearing 202 in the direction of the eccentricity e from said central axis 202a.

The two pivots 210 extend through legs 212 of a U-shaped support 213 the web of which is connected for instance by welding to a machine or supporting part 214.

FIGS. 8 and 9 show a most advantageous embodiment of the invention according to which the pivot axis 211 of frame 209 extends through the point 215 which represents the Hertz pressure maximum of the contact surface between the inner ring 206 and the respective thread section of thread 216 of spindle 201. The contact surface preferably does not form a sickle shaped surface 217 but rather a surface 218 which has been specially shaded in FIG. 9 while the pressure center point 215 (Hertz pressure maximum) is located approximately in the center of gravity of the surface 218.

Even when transmitting large forces through spindle 201 onto the frame 209 or vice versa, due to the cardanic suspension of the anti-friction bearing 202, a highly wear resistant and lubricant-free moment of the spindle 201 relative to the anti-friction bearing 202 is obtained while the inner ring 206 of this bearing adapts itself in an optimum manner to the location of the thread section of the spindle which is engaged by the inner ring of the anti-friction bearing.

It is, of course, to be understood that the present invention is by no means limited to the specific showing in the drawings but also comprises any modifications within the scope of the appended claims.

What I claim is:

1. A screw drive which includes in combination: a threaded spindle having threads and a spindle axis, frame means extending around said threaded spindle, anti-friction bearing means extending around said threaded spindle and interposed between said frame means and said threaded spindle, said anti-friction bearing means comprising an inner ring having an axis and meshing with said threaded spindle and having a central axis inclined and eccentrically arranged relative to the longitudinal axis of said threaded spindle, said anti-friction bearing means also having an outer ring pivotally supported by said frame means for avoiding binding by pivoting about a rigid pivot axis extending in the direction of the eccentricity of the axis of said inner ring with regard to said spindle axis thereby to utilize said threaded spindle for pivoting said outer ring about said rigid axis and avoiding binding as a consequence thereof and making possible lifting of greater loads.

2. A screw drive which includes: a threaded spindle, frame means extending around said spindle, anti-friction bearing means extending around said spindle and interposed between said frame means and said spindle, said anti-friction bearing means comprising an inner ring meshing with said threaded spindle and having a central axis inclined and eccentrically arranged relative to the longitudinal axis of said spindle, said anti-friction bearing means also having an outer ring supported by said frame means for movement freely about a rigid axis extending in the direction of the eccentricity of the axis of said inner ring with regard to said spindle axis, said frame means having an axis offset in the direction of the eccentricity with regard to the center of said anti-friction bearing means and extending perpendicularly with regard to the direction of said eccentricity and in the direction toward said spindle axis, said outer ring being resiliently arranged with regard to said frame.

3. A screw drive according to claim 2, in which said frame means is provided with two axially aligned bores, and in which said outer ring has two threaded pivots extending in the direction of said eccentricity and received by said bores.

4. A screw drive according to claim 3, in which those parts of said frame means which receive said threaded pivots are resilient in the direction of said eccentricity.

5. A screw drive according to claim 4, which includes means for varying the resilient force acting upon said outer ring.

6. A screw drive according to claim 3, in which said threaded pins are axially adjustable in the direction of said eccentricity in said frame means.

7. A screw drive according to claim 2, in which said frame means is U-shaped and has two webs located opposite to each other and provided with said bores for receiving pivots means.

8. A screw drive according to claim 2, in which said frame means includes a plate shaped part with parallel legs substantially perpendicular to said plate shaped part, said bearing means being pivotable between said legs and said spindle extending through said plate shaped part.

9. A screw drive according to claim 2, in which the axis of said frame means extends through the contact point of the maximum pressure between the inner ring flank and the respective section of the spindle thread flank engaging same.

10. A screw drive according to claim 2 which includes supporting means at least partially surrounding said frame means and provided with lateral parts having journaled therein means determining the axis of said frame means.

* * * * *